United States Patent [19]

Hung

[11] Patent Number: 4,502,226
[45] Date of Patent: Mar. 5, 1985

[54] MEASURE TAPE AND KEY CHAIN COMBINED DEVICE

[76] Inventor: Kuo-Liang Hung, No. 48, Lane 21, Fu Te 3rd Rd., Kaohsiung, Taiwan

[21] Appl. No.: 471,710

[22] Filed: Mar. 3, 1983

[51] Int. Cl.³ .............................................. G01B 3/10
[52] U.S. Cl. ...................................... 33/138; 242/84.8; 70/456 R
[58] Field of Search ........................... 33/138, 137 R; 242/84.8, 129.3, 118.41; 70/456 R; D3/61

[56] References Cited

U.S. PATENT DOCUMENTS

| | | | |
|---|---|---|---|
| 1,802,402 | 4/1931 | Best | 70/456 R |
| 2,684,534 | 7/1954 | Ljungberg | 33/138 |
| 3,191,308 | 6/1965 | Lindenau | 33/138 |
| 3,450,367 | 6/1969 | Edgell | 33/138 |
| 3,568,483 | 3/1971 | Woofter | 33/138 |
| 4,422,316 | 12/1983 | Thomas et al. | 70/456 R |

Primary Examiner—Willis Little
Attorney, Agent, or Firm—Holman & Stern

[57] ABSTRACT

A tape measure and key chain combined device comprising a cover and rotating shaft having a spiral torsion spring and key chain pulley connected to the shaft with the tape measure connected to the spring so that the key chain and tape are rewound respectively. By pulling either the tape or the key chain, the spiral torsion spring contracts to allow the tape or key chain to be extracted from the cover for use and automatically recoils after use by the spiral torsion spring expansion.

5 Claims, 10 Drawing Figures

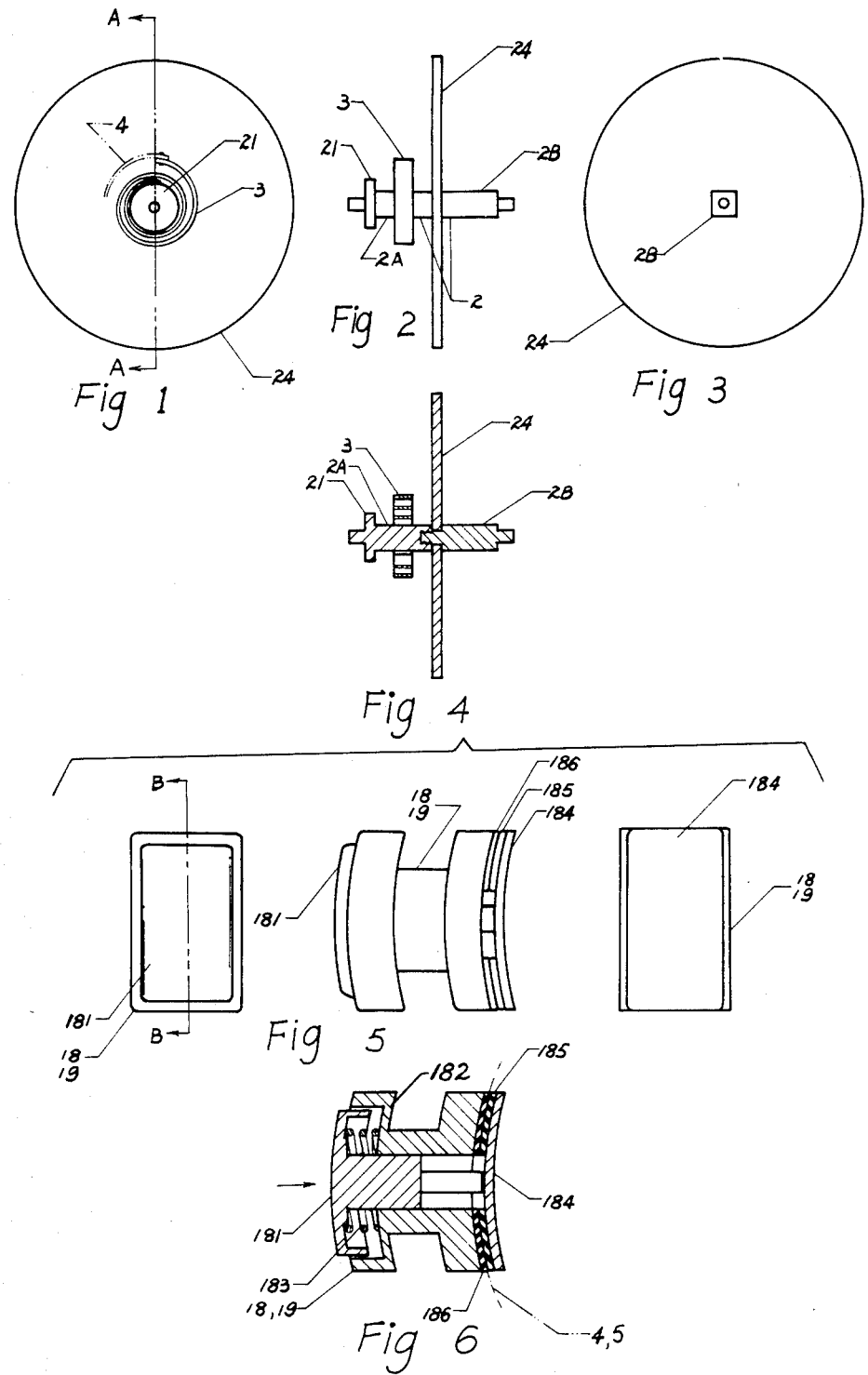

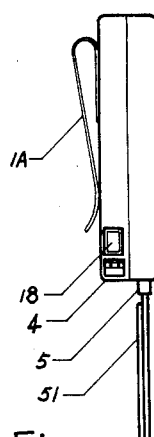
Fig 7
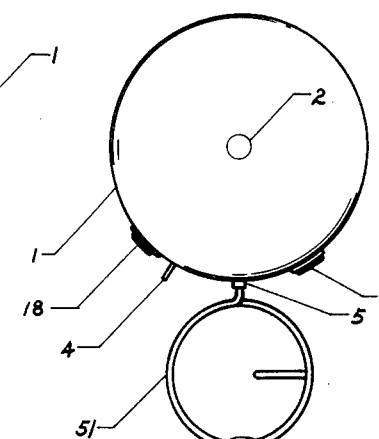
Fig 8
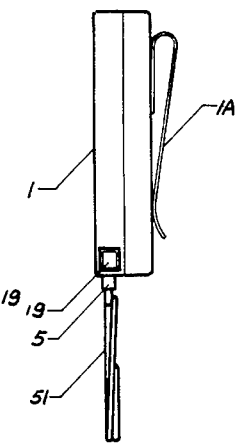
Fig 9
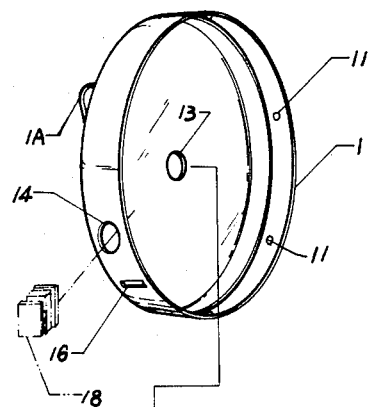
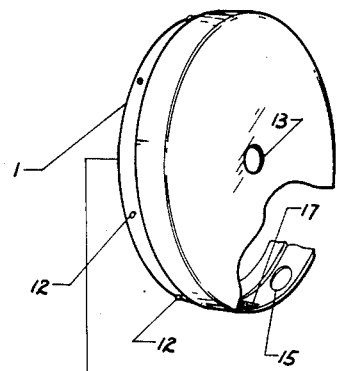
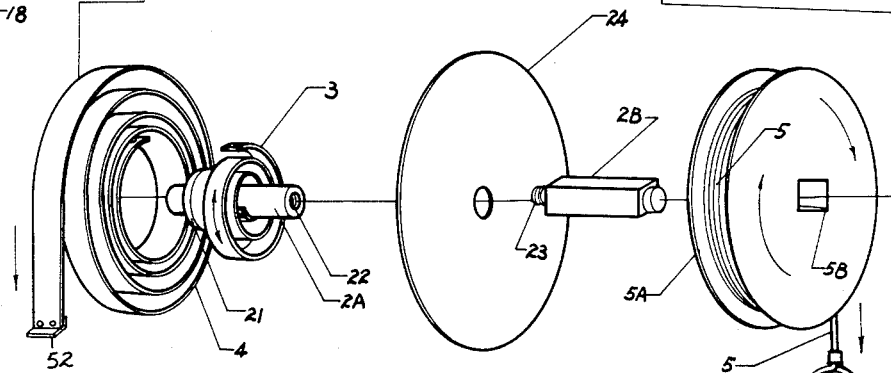
Fig 10

4,502,226

MEASURE TAPE AND KEY CHAIN COMBINED DEVICE

FIELD OF THE INVENTION

This invention relates to a device comprised of a tape measure and a key chain in a single unit utilizing a common return spring.

BRIEF SUMMARY OF THE INVENTION

One object of the present invention is to provide two kinds of useful functions in the same unit and using a common spring power.

Another object of the present invention is to provide a tape measure and key chain both of which function with only a single spiral torsion spring.

Yet another object of the present invention is to provide a handy tape measure and key chain device at lower cost and having a small size.

BRIEF DESCRIPTION OF THE SEVERAL VIEWS OF THE DRAWINGS

The present invention will now be described with greater clarity and specificity with reference to the accompanying drawings wherein:

FIG. 1 is a left side elevational view of the rotating shaft with attachments as shown in FIG. 2, according to the invention;

FIG. 2 is a front elevational view of the rotating shaft with attachments;

FIG. 3 is right side elevational view of the rotating shaft with attachments as shown in FIG. 2;

FIG. 4 is a cross-sectional view of the rotating shaft taken along line A—A of FIG. 1;

FIG. 5 is a front elevational and right and left side view of the control button according to the invention;

FIG. 6 is a cross-sectional view of the control button shown in FIG. 5, taken alone line B—B;

FIG. 7 is a left side elevational view of the present invention after being assembled;

FIG. 8 is a front elevational view of the present invention after being assembled;

FIG. 9 is right side elevational view of the present invention after being assembled; and FIG. 10 is an exploded perspective view of the present invention.

DESCRIPTION OF THE PREFERRED EMBODIMENTS

As shown in the drawings, the present invention comprises two covers 1, a rotating shaft 2, a spiral torsion spring 3, a tape measure 4, and key chain 5.

Noting FIG. 10, the covers 1 are formed dish-shaped and connected and assembled by means of its peripheral surface having two interfitting convexities 11 and concavities 12 respectively, and include openings 13 in the center portions for insertion thereinto of the rotating shaft 2. In the peripheral surface of each cover there is an opening 14,15 for insertion thereinto of the tape measure and key chain control button 18,19, respectively, and tape measure and key chain passageways 16,17 for pulling out or recoiling into therein of the tape measure 4 and the key chain 5 respectively. One of the covers 1 is provided with a hook 1A for hanging and carrying the device easily.

The rotating shaft 2 consists of a cylindrical shaft 2A and rectangular shaft 2B assembled together end to end by internal and external threaded ends 22, 23 respectively, and both treated with thread painting glue before being assembled to prevent looseness. The cylidrical shaft 2A portion is provided with a stop flange 21 and spiral torsion spring 3 is mounted therein spring 3 being connected to the tape 4 at its outer end. The tape 4 structure is the same as a conventional tape and is pulled out through passageway 16 of the cover 1. The tape 4 is stretched or recoiled by means of the control button 18 which is provided with a rubber sheet 186 at its inside portion, a button 181 and a flange 182 providing a recess for insertion of the coil spring 183. At the inside portion of the button 181 is provided a stop plate 184 with a rubber sheet 185. FIG. 6 shows the braked position, i.e. where the coil spring 183 urging the button 181 outwardly driving the stopped plate 184 outwardly to press the rubber sheet 185 of the control button 181 against the rubber sheet 186 to brake the measure tape 4 which is between these two rubber elements. To use the tape measure 4, one merely depresses button 181 inwardly, whereupon the rubber sheets 185,186 will separate and the measure tape 4 may be pulled out for use or automatically recoiled by the spiral torsion spring 3 expansion.

Between the cylindrical shaft 2A and rectangular shaft 2B threaded connecting portions there is a plate 24 to separate the tape measure 4 and key chain 5. The shaft portion 2B has mounted thereon a chain pulley 5A for winding therein of the key chain 5 and said chain pulley 5A has a rectangular hole 5B in the center portion to receive the rectangular shaft 2B when assembled. The key chain 5 is pulled out through the passageway 17 of the cover 1 and connected to a key ring 51 of its end. The key chain 5 is positioned between rubber sheets 185, 186 and is stretched or recoiled by means of the control button 19 which structure and operation is the same as the control button 18.

In operation, the present invention is assembled by conventional technique, so that the pulling direction of the tape measure 4 and key chain 5 is opposite. When it is desired to use the tape measure 4, the user depresses the button 181 inwardly then pulls the end of the tape 4. The shaft 2 can not rotate since the key ring 51 is stopped at the key chain passageway 17 of the cover 1. Therefore the spiral torsion spring 3 will contract from outside to inside. With release of the button 181, the coil spring 183 will urge the button 181 outwardly and the rubber sheets 185,186 will come together to brake the tape 4 to prevent it from recoiling or stretching. When it is desired to use the key chain 5, the user depresses the button 181 of the control button 19 inwardly, then pulls the key chain 5. The shaft 2 and chain pulley 5A can rotate causing the spiral torsion spring 3 to contract from inside to outside since the tape 4 is stopped by the stop member 52 on the end at the tape passageway 16 of the cover 1.

I claim:

1. A combined tape measure and key chain device comprising:

a hollow cover;

a shaft rotatably mounted at its ends in said cover;

a spiral torsion spring with said cover attached at its inner end to said shaft;

a measuring tape in said cover spirally coiled about said shaft and attached at its inner end to the outer end of said spring;

a tape passage in said cover through which said tape is extendable;

a step means on the outer end of said tape to prevent said outer end from being drawn inside said cover;

a key chain in said cover spirally coiled about said shaft;

means to fix said chain at its inner end to said shaft;

a key chain passage in said cover through which said key chain is extendable;

a stop means on the outer end of said key chain to prevent said outer end from being drawn inside said cover; and a push button control to selectively brake and release said tape and chain, so that either said tape or chain may be uncoiled and extended from said cover and recoiled by said spiral spring comprising;

a push button slidably mounted in said push button mounting member, a clamping member on the inner end of said push button, said tape extending between said clamping member and said mounting member, a spring mounted between said push button and push button mounting member to resiliently urge said push button outwardly so that said clamping member releasably clamps said tape against said mounting member to prevent recoiling thereof, a second push button mounting member attached to and extending through said cover, a second push button slidably mounted in said second mounting member, a second clamping member on the inner end of said second push button, said key chain extending between said second clamping member and said second mounting member, and a spring mounted between said second push button and mounting member to resiliently urge said push button outwardly so that said second clamping member releasably clamps said chain against said second mounting member to prevent recoiling thereof.

2. The device as claimed in claim 1 wherein said tape is spirally coiled about said spiral spring.

3. The device as claimed in claim 2 wherein said spring and pulley are spaced with respect to each other, and further comprising, a separating plate disposed between said tape and said pulley.

4. The device as claimed in claim 1 and further comprising rubber clamping members on the tape and chain engaging portions of said clamping and push button mounting members.

5. The device as claimed in claim 3 and further comprising rubber clamping members on the tape and chain engaging portions of said clamping and push button mounting members.

* * * * *